United States Patent
Umezaki et al.

(10) Patent No.: US 6,281,928 B1
(45) Date of Patent: Aug. 28, 2001

(54) POSITIONAL DETECTOR DEVICE FOR A VEHICULAR LICENSE PLATE

(75) Inventors: Taizo Umezaki, Gifu-ken (JP); Takeo Kanade, Pittsburgh, PA (US); Noriyuki Matsumoto, Nagoya (JP)

(73) Assignee: Chuo Hatsujo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/076,791

(22) Filed: May 13, 1998

(51) Int. Cl.$^7$ .................................................. H04N 7/18
(52) U.S. Cl. ............................................. 348/148; 382/105
(58) Field of Search .................................. 348/148, 149; 382/105, 278, 284, 282, 299, 300; 340/933, 937, 928, 905, 901

(56) References Cited

U.S. PATENT DOCUMENTS

| | | | |
|---|---|---|---|
| 5,651,075 | * | 7/1997 | Frazier et al. ......................... 382/105 |
| 5,657,402 | * | 8/1997 | Bender et al. ......................... 382/284 |
| 5,734,337 | * | 3/1998 | Kupersmit ............................. 340/937 |
| 5,805,082 | * | 9/1998 | Hassett ................................. 340/928 |

* cited by examiner

Primary Examiner—Chris Kelley
Assistant Examiner—Shawn S. An
(74) Attorney, Agent, or Firm—Sughrue, Mion, Zinn, Macpeak & Seas, PLLC (57) ABSTRACT

In a positional detector device for a license plate of a motor vehicle, a camera is provided to photograph a front and rear portion of a motor vehicle so as to produce an image signal. An A/D converter converts the image signal into a digital image. A positional detector detects a position of a lisence plate of a motor vehicle based on the digital image. A cut-off treatment device cuts off a specified region from an original image photographed by the camera while scanning the original image when the motor vehicle approaches the camera member within a predetermined distance. An edge refining treatment device emphasizes a contour of a pattern represented by the specified region cut off from the original image. A contraction treatment device contracts an image size of the specified region which was treated with the edge refining treatment device. A calculation treatment device feeds the contracted pattern to a learned neural network so as to calculate an output value for a positional detection neural network. A coordinate transformation device transforms the output value of the positional detection neural network to such a scale as to meet the original image. An addition treatment device adds data at specified points which were multiplied by Gaussian window so as to obtain a projective addition value after carrying out the coordinate transformation. A distinction treatment device recognizes a position of the license plate based on a maximum value on which the projective addition value falls.

4 Claims, 8 Drawing Sheets

① : with Gaussian window provided
② : with Gaussian window not provided

$$W(x,y) = exp\left(-\frac{x^2+y^2}{2}\right)$$

$$\left(-\frac{l}{2} < x < \frac{l}{2}, -\frac{l}{2} < y < \frac{l}{2}\right)$$

$l$ : scale of Gaussian window

POSITIONAL DETECTOR DEVICE FOR A VEHICULAR LICENSE PLATE

BACKGROUND OF THE INVENTION

1. Field of the Invention

The invention relates to a positional detector device which is provided to detect license plates of motor vehicles.

2. Description of Prior Art

A motor vehicle control device has been introduced to administer entrances and exits of motor vehicles by reading the number of the license plate to obtain the numerical information on such places as parking lots and highway toll gates. In order to automatically recognize the numerical information of the license plate, it is necessary to detect a position of the license plate, and isolate the number to make the number distinct.

Whether or not the positional detection of the license plate is accurate significantly affects on the precision of the subsequent treatments. This is because it is particularly important to precisely carry out the positional detection of the license plate.

The following methods have been introduced to detect the position of the license plate from a frontal image of the motor vehicle.

(1) It is detected from straight lines (horizontal, vertical) of the contour of the license plate with the use of Huff's transformation.

(2) It is detected by tracing horizontal and vertical edges as disclosed by e.g., Laid-open Japanese Patent Application No. 6-28596.

(3) It is recognized by detecting the consecutive four or less digits of the number drawn on the license plate so as to distinct the number plate region with the use of two-value treatment and labeling treatment as disclosed by e.g., Laid-open Japanese Patent Application Nos. 60-193084 and 4-101286.

However, especially under adverse photographing conditions, it is difficult to detect the position of the license plate with the methods (1)~(3) because an image is produced in which the contour of the license plate and its numerical region are illegible. The same holds true when the license plate has a similar coloration of the background components (e.g., bumper and chassis).

Therefore, it is a main object of the invention to provide a positional detector device for a license plate which is capable of detecting a positon of a license plate with high precision even when a photographed image is produced in which the contour of the license plate and its numerical region are illegible.

SUMMARY OF THE INVENTION

According to the present invention, there is provided a positional detector device for a license plate comprising: a camera member which photographs a front and rear portion of a motor vehicle so as to produce an image signal; an A/D converter which converts the image signal into a digital image; a positional detector member which detects a position of a license plate of a motor vehicle based on the digital image; a cut-off treatment member which cuts off a specified region from an original image photographed by the camera member while scanning the original image when the motor vehicle approaches the camera member within a predetermined distance; an edge refining treatment member which emphasizes a contour of a pattern represented by the specified region cut off from the original image; a contraction treatment member which contracts an image size of the specified region which was treated with the edge refining treatment member; a calculation treatment member which feeds the contracted pattern to a learned neural network so as to calculate an output value for a positional detection neural network; a coordinate transformation member which transforms the output value of the positional detection neural network to such a scale as to meet the original image; an addition treatment member which adds data at specified points which were multiplied by Gaussian window so as to obtain a projective addition value after carrying out the coordinate transformation; and a distinction treatment member which recognizes a position of the license plate based on a maximum value on which the projective addition value falls.

According to another aspect of the invention, there is provided a positional detector device for a license plate comprising: a camera member which photographs a rear portion of a motor vehicle so as to produce an image signal when the motor vehicle approaches the camera member within a predetermined distance; an A/D converter which converts the image signal into a first sized original image; a positional detector member which detects a position of a license plate of a motor vehicle based on the original image; a cut-off treatment member which cuts off a second sized region from the first sized original image photographed by the camera member while scanning the first sized original image; an edge refining treatment member which emphasizes a contour of a pattern represented by the second sized region cut off from the first sized original image; a contraction treatment member which contracts the second sized region into a third sized image after treated with the edge refining treatment member; a calculation treatment member which feeds the contracted pattern of the third sized image to a learned neural network so as to calculate an output value for a positional detection neural network as a fourth sized image value; a coordinate transformation member which projects the output value of the positional detection neural network to a positional distinction pattern, a size of which is the same as that of the first sized region, and transforming the fourth sized image value into the second sized region; an addition treatment member which adds data at specified points which were multiplied by Gaussian window to a positional distinction pattern of the license plate so as to obtain a projective addition value after carrying out the coordinate transformation; and a distinction treatment member which recognizes a position of the license plate based on a maximum value on which the projective addition value falls.

According to another aspect of the invention, learning of the neural network is based on a back propagation method which employs learning date and teaching data, and a unit threshold function is based on sigmoid function.

According to still another aspect of the invention, the detector device is used to recognize a number of the license plate when the motor vehicle passes through a highway toll gate without stopping there.

With photographed images of the frontal and rear portion of coming and going motor vehicle taken by the camera, the image signal is produced, The image signal is converted into the digital image through the A/D converter.

On the basis of the original image taken when the motor vehicle approaches within the predetermined distance, the specified small image is cut off from the original image while scanning the original image (cut-off treatment).

The edge refining treatment is carried out to extract common features such as the letters and the contour of the license plate among various types of the license plates in which black, white and black letters are in turn drawn with white, green and yellow backgrounds.

The photographing conditions generally vary depending on seasons of the year and hours of the day so as to deteriorate the contrast of the image. However, the edge refining treatment involves differential calculus procedures. This remains the image substantially immune to the direct current component.

After going through the edge refining treatment, the size of the imgage is contracted to eliminate the unsubstantial information, and meeting the input size for the neural network (contraction treatment).

The contracted pattern of the image is fed to the learned neural network so as to calculate the output value for the positional detective neural network (calculation treatment).

The output value is reduced to a scale proportionate to the original image by way of the coordinate transformation (coordinate transformation treatment).

In order to achieve the high precision, the data obtained after the coordinate transformation treatment are added at each point multiplied by the Gaussian window so as to attain the projective addition value (addition treatment).

The position of the license plate is specified based on a maximum position on which the projective addition value falls (distinction treatment).

When the camera produces the somewhat blurred image in which the contour of the license plate and letter region are illegible under the adverse photographing conditions due to the seasonal weather of the year and hours of the day, it is nonetheless possible to detect the position of the license plate with high precision.

With the coming motor vehicle approached the camera within the predetermined distance, the camera photographs the rear portion of the motor vehicle to produce the image signal.

The A/D converter reduces the image signal to the original image of the first sized image (e.g., 512 pixels×480 pixels).

While scanning the original image, the second sized small region (e.g., 192 pixels×96 pixels) is cut off from the original image (cut-off treatment).

The edge refining treatment (e.g., Sobel transformation) is carried out to extract common features such as the letters and the contour of the license plate so as to emphasize the contour portion of the cut off small region pattern among various types of the license plates in which black, white and black letters are in turn drawn with white, green and yellow backgrounds.

The photographing conditions generally vary depending on seasons of the year and hours of the day so as to deteriorate the contrast of the image. However, the edge refining treatment involves differential calculus procedures. This remains the image substantially immune to the direct current component.

After undergoing the edge refining treatment, the size of the imgage is contracted to eliminate the unsubstantial information, and meeting the third sized image (e.g., 32 pixels×16 pixels) for the neural network (contraction treatment).

The contracted pattern of the image is fed to the learned neural network so as to calculate the output value for the positional detective neural network of the fouth sized image (e.g., 16 pixels×8 pixels) (calculation treatment).

In order to project the output value of the neural network to the positional distinction pattern proportionate to the first sized image, the output value of the fourth sized image is transformed into the second sized image (e.g., 192 pixels×96 pixels) (coordinate transformation treatment).

After the coordinate transformation treatment, the data are added at each point multiplied by the Gaussian window so as to attain the projective addition value (addition treatment).

The position of the license plate is identified based on a maximum position on which the projective addition value falls (distinction treatment).

When the photograph produces somewhat blurred image in which the contour of the license plate and letter region are illegible under the adverse photographing conditions due to the seasonal weather of the year and hours of the day, it is nonetheless possible to detect the position of the license plate with high precision.

With the learning of the neural network based on the back propagation method which employs learning date and teaching data, and the unit threshold function is based on the sigmoid function, it is possible for the neural network to achieve a quick learning so as to precisely detect the position of the license plate with small hours of learning.

DETAILED DESCRIPTION OF THE PREFERRED EMBODIMENTS OF THE INVENTION

Figure 1:
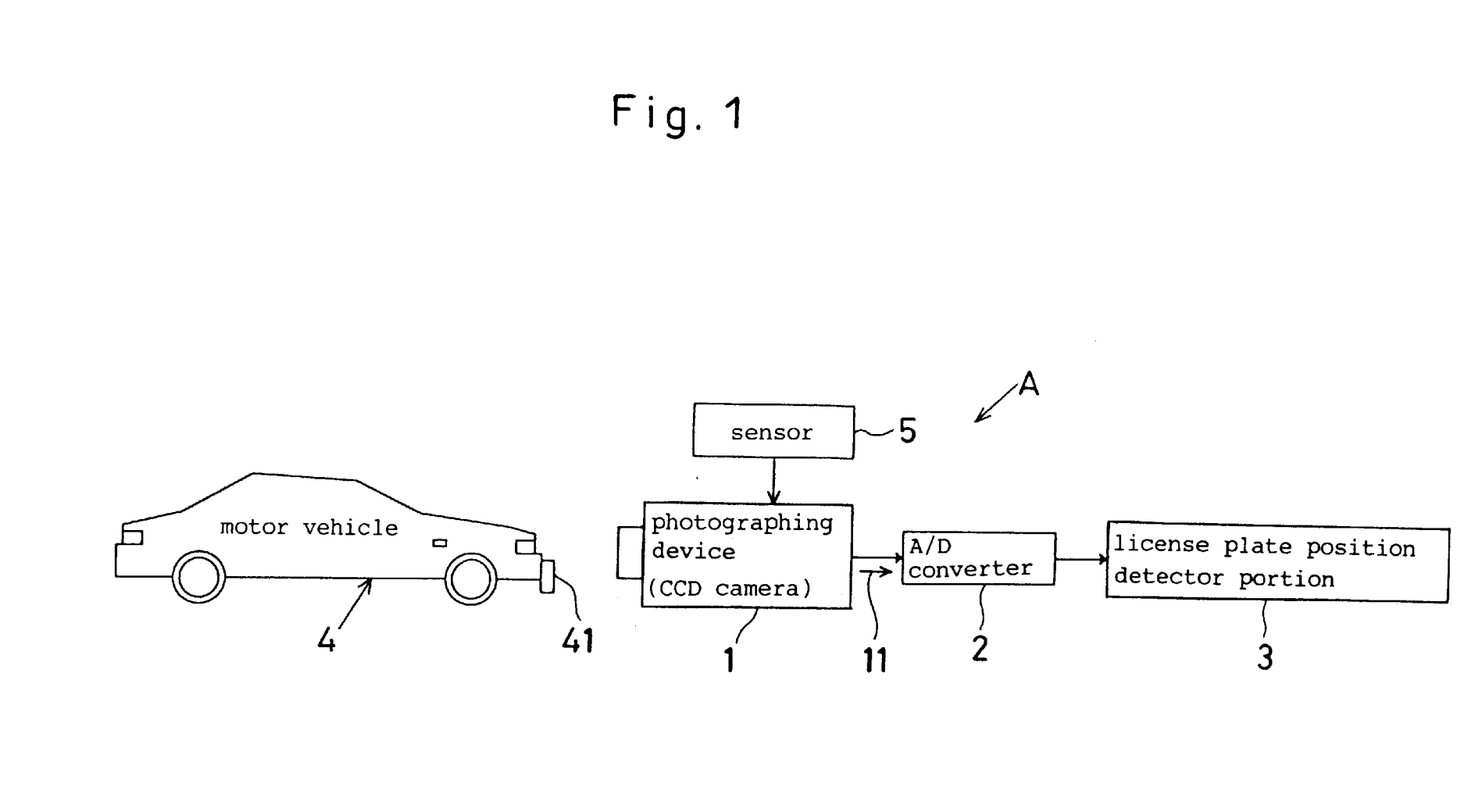
FIG. 1 is a block diagram of a positional detector device for a license plate of a motor vehicle according to an embodiment of the invention.

Referring to FIGS. 1 through 8, a positional detector device for a license plate has a CCD camera 1 installed on a toll gate of a parking lot or highway as shown at (A) in FIG. 1. The positional detector device (A) further has an A/D converter 2 which converts an image signal 11 into digital data. A license plate position detector portion 3 is provided to detect a position of the license plate 41 for a motor vehicle 4. The positional detector device (A) thus assembled is incorporated into a license plate reading device (not shown).

The camera 1 is placed to direct toward the coming motor vehicle 4, and adapted to photograph a frontal portion (including a license plate 41) of the motor vehicle 4 when a sensor 5 perceives that the motor vehicle 4 approaches within a predetermined distance. The photograph is reduced to an image signal 11 which is fed to the A/D converter 2 so as to change the image signal 11 into a digital image in which a size of an original image 31 is in the scale of 512 pixels×480 pixels.

Figure 2:
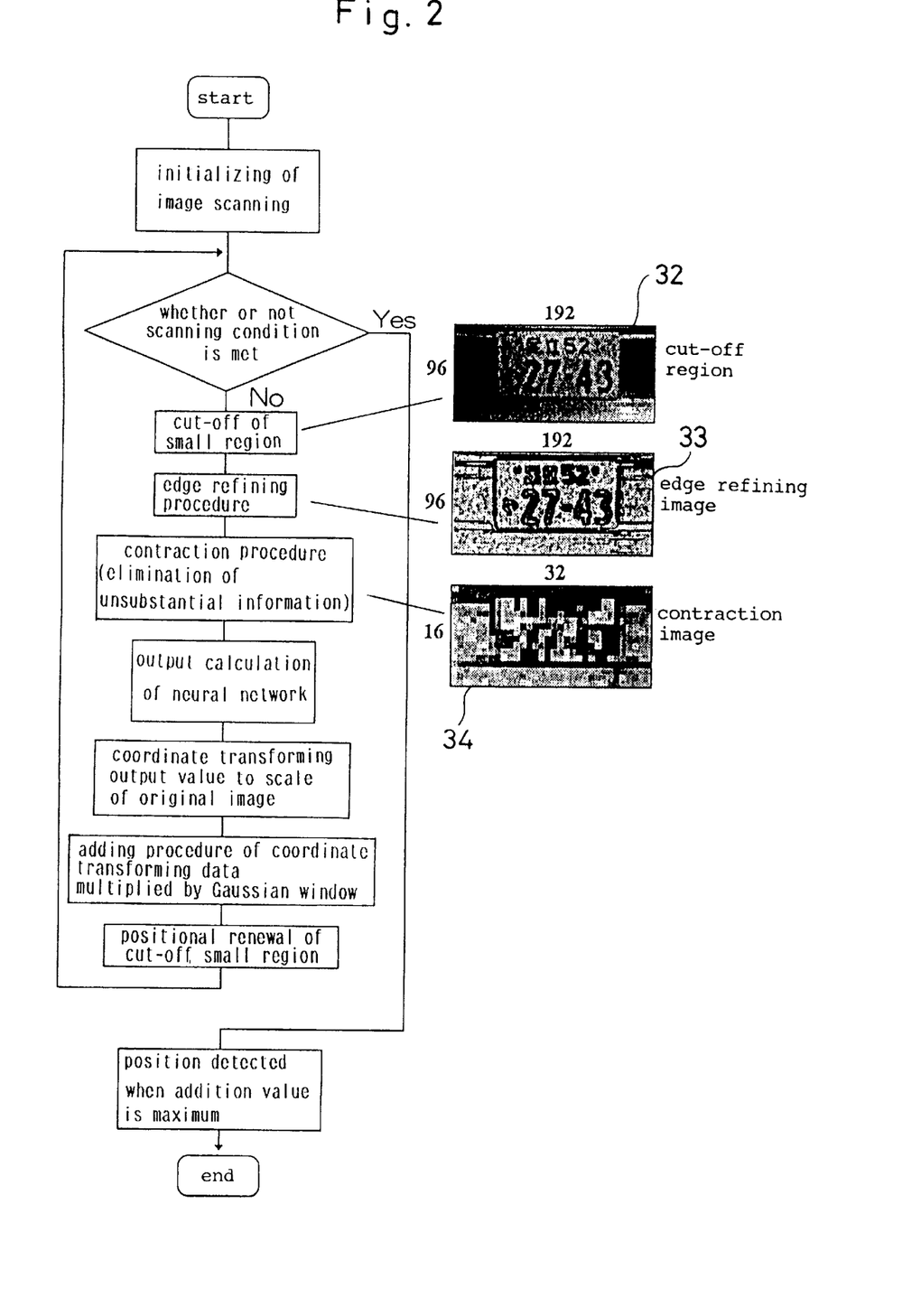
FIG. 2 is a flow chart showing how a license plate position detector portion works.

Under the presence of the motor vehicle 4 passing through the highway toll gate, the license plate position detector portion 3 detects the position of the license plate 41 by carrying out a cut-off treatment, edge refining treatment, contraction treatment, output value calculation treatment, coordinate transformation treatment, addition treatment and distinction treatment in accordance with a flow chart in FIG. 2.

Cut-Off Treatment

While scanning the original image 31, a second sized small region 32 is cut off from the original image 31 as a target object which includes the license plate 41. In this instance, it is possible to cut off the second sized small region by shifting from upper left side to lower right side of the original image 31 (cut-off treatment in FIG. 2).

The shifting width is such that the small sized regions overlap each other as exemplified by the size of 32 pixels. This makes it possible to commonly share the neighboring area of the small sized regions so as to recognize the license plate 41 with high precision. It is to be observed that the cut-off size may be such that the small sized regions does not overlap each other.

Edge Refining Treatment

An edge refining treatment is carried out to extract common features such as the letters and the contour of the license plate 41 among various types of the license plates in which black, white and black letters are in turn drawn with white, green and yellow backgrounds.

The small sized region 32 cut off from a cut-off window 321 is subjected to Sobel transformation treatment (3×3 size) to extract the contour of the license plate 41. Edges of the cut-off region are emphasized as shown at an edge refined image 33 in FIG. 2.

Under the conditions which generally vary depending on seasons of the year and hours of the day so as to deteriorate the contrast of the original image, the edge refining treatment involves differential calculus procedures so that the original image 31 remains substantially immune to the direct current component.

Contraction Treatment

In order to correspond to an input layer size of a neural network, 192 pixels×96 pixels of the edge refined image 33 is altered to 32 pixels×16 pixels of a contraction pattern image 34 so as to eliminate unsubstantial information as referred to a size contraction in FIG. 2.

One pixel value of the contraction pattern image 34 is e.g., an average derived from the pre-contraction pattern 6×6. The pattern image 34 may be contracted with some weight added. It is necessary to change the contraction size when the size of the original image 31 is altered.

Output Value Calculation Treatment

The contraction pattern image 34 is fed to a neural network in which learning procedures have completed as described hereinafter. This is to execute an output value calculation treatment so as to produce an output value for the neural network as exemplified by "output value calculation for neural network" in FIG. 2.

Explanation of Neural Network

Figure 6:
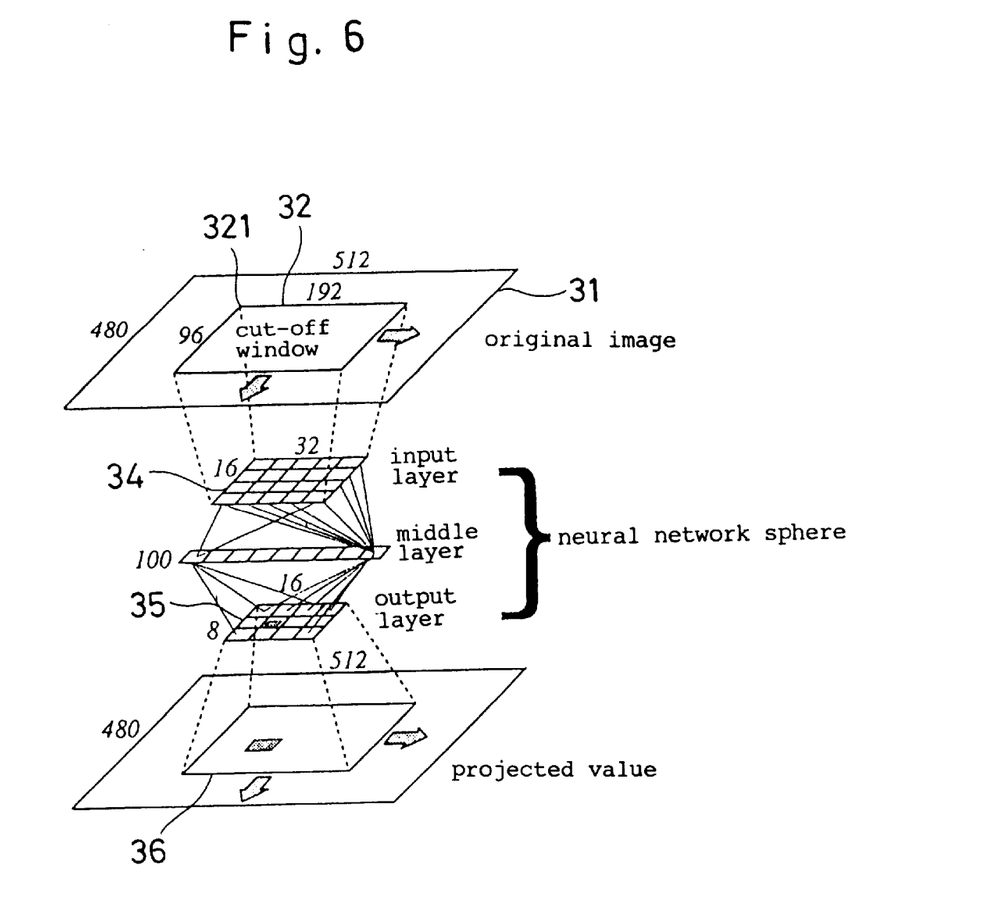
FIG. 6 is an explanatory view showing of a neural network model.
Figure 7:
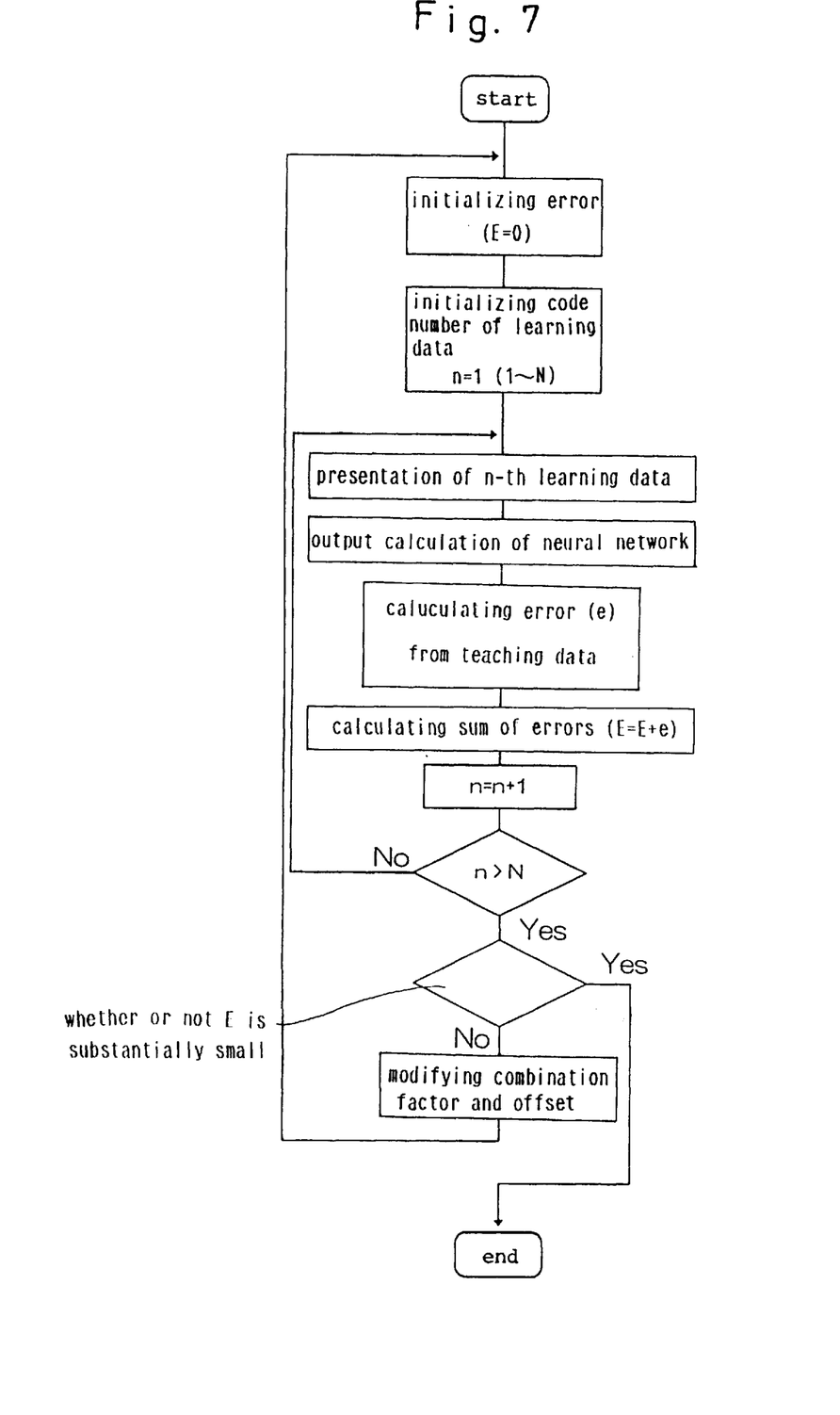
FIG. 7 is a flow chart showing a propagation learning method.
Figure 8:
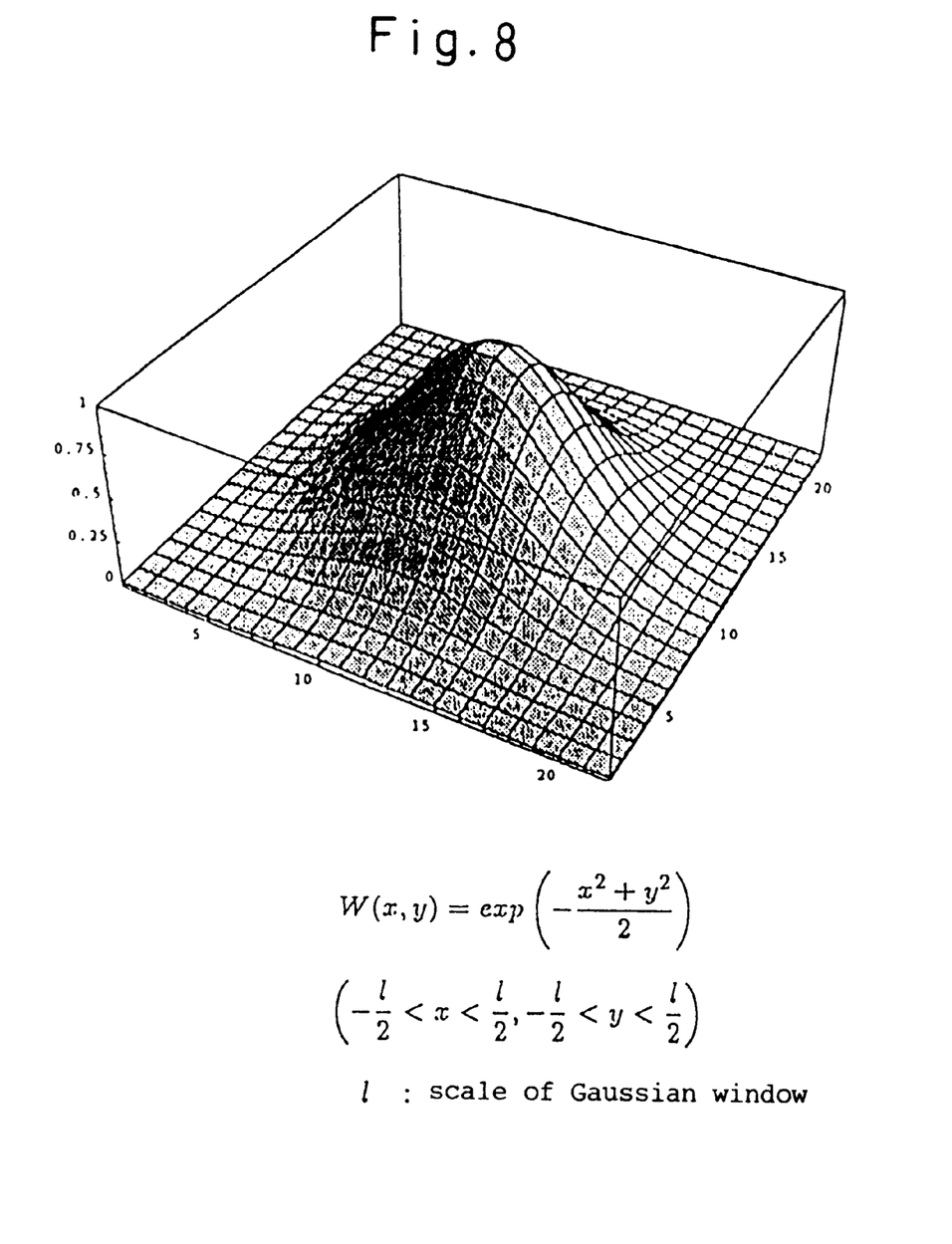
FIG. 8 is an explanatory view showing the Gaussian window.

The neural network model is three-layered stratum neural network as shown in FIG. 6.

A unit threshold function employs sigmoid function $f(x) = 1.0/\{1.0 + \exp(-x/u_0)\}$. It is preferable to set gradient ($u_0$) of the sigmoid function $f(x)$ in such a value as the neural response becomes dull, as represented by 2.0 rather than 1.0.

Coordindate Transformation Treatment

The output value of the neural network is projected to a license plate position detection pattern, a size of which is similar to the original image (targetted image) in length and breadth, so as to carry out a coordinate transformation in which an output layer 35 (16 pixels×8 pixels size) develops (projective expansion) into a coordinate corresponding to 192 pixels×96 pixels. This is shown in FIG. 2 as "coordinate transformation of output value proportionate to the scale of the original image". It is to be observed that an equimultiple projection may be carried out instead of the projective expansion.

Addition Treatment

In order to do the license plate position detection with high precision after the end of the coordinate transformation, data 36 are multiplied at each point by Gaussian window (an added weight in FIG. 8), and multiplied value is added to the license plate position distinction pattern so as to obtain a projective addition value, as referred to "adding coordinate-transformed data multiplied by Gaussian window" in FIG. 2. It is to be noted that the Gaussian window may be omitted.

If the projectively expanded output from the neural network is directly added, there is a possibility that the position (e.g., head lamp) except for where the license plate 41 is located may be mistakenly detected.

Figure 3:
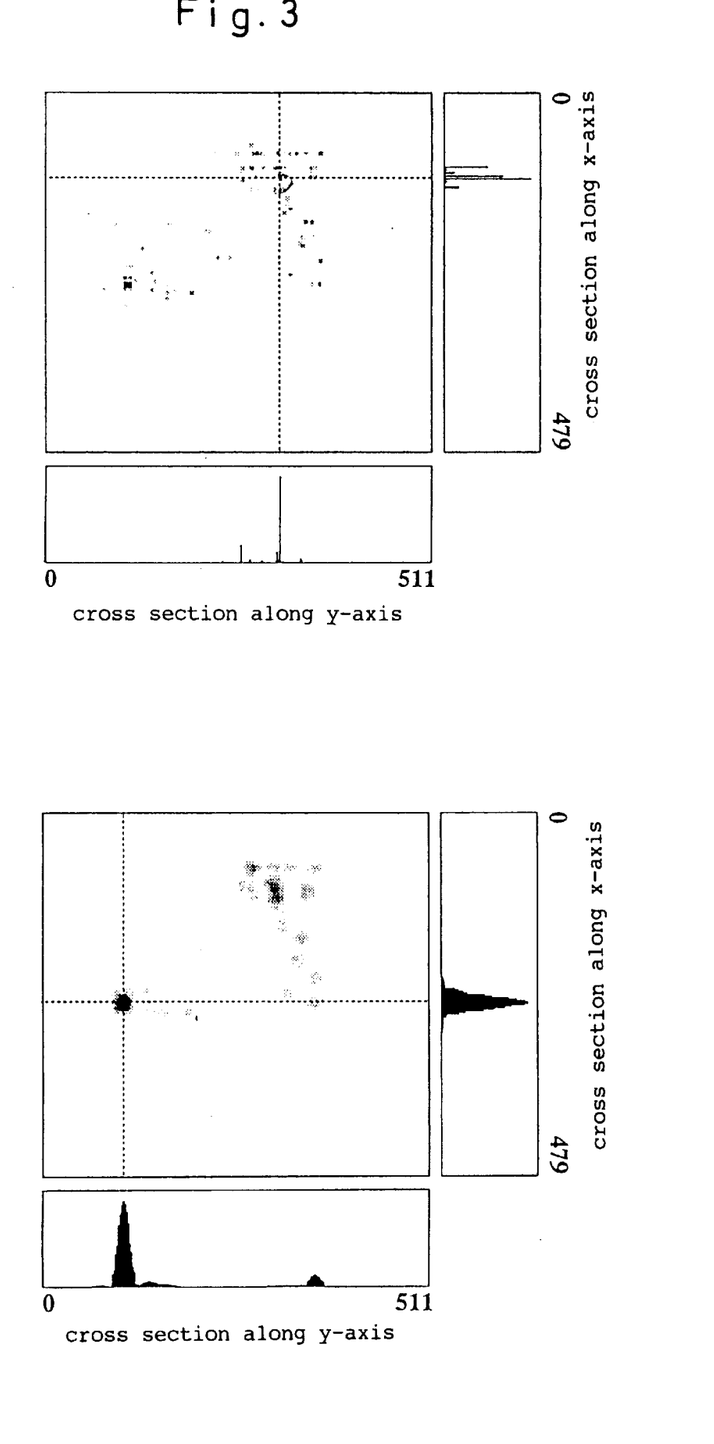
FIG. 3 is a graphical distribution of a projective addition value shown to compare the case in which Gaussian window is provided (upper portion) to the case in which Gaussian window is not provided (lower portion)
Figure 4:
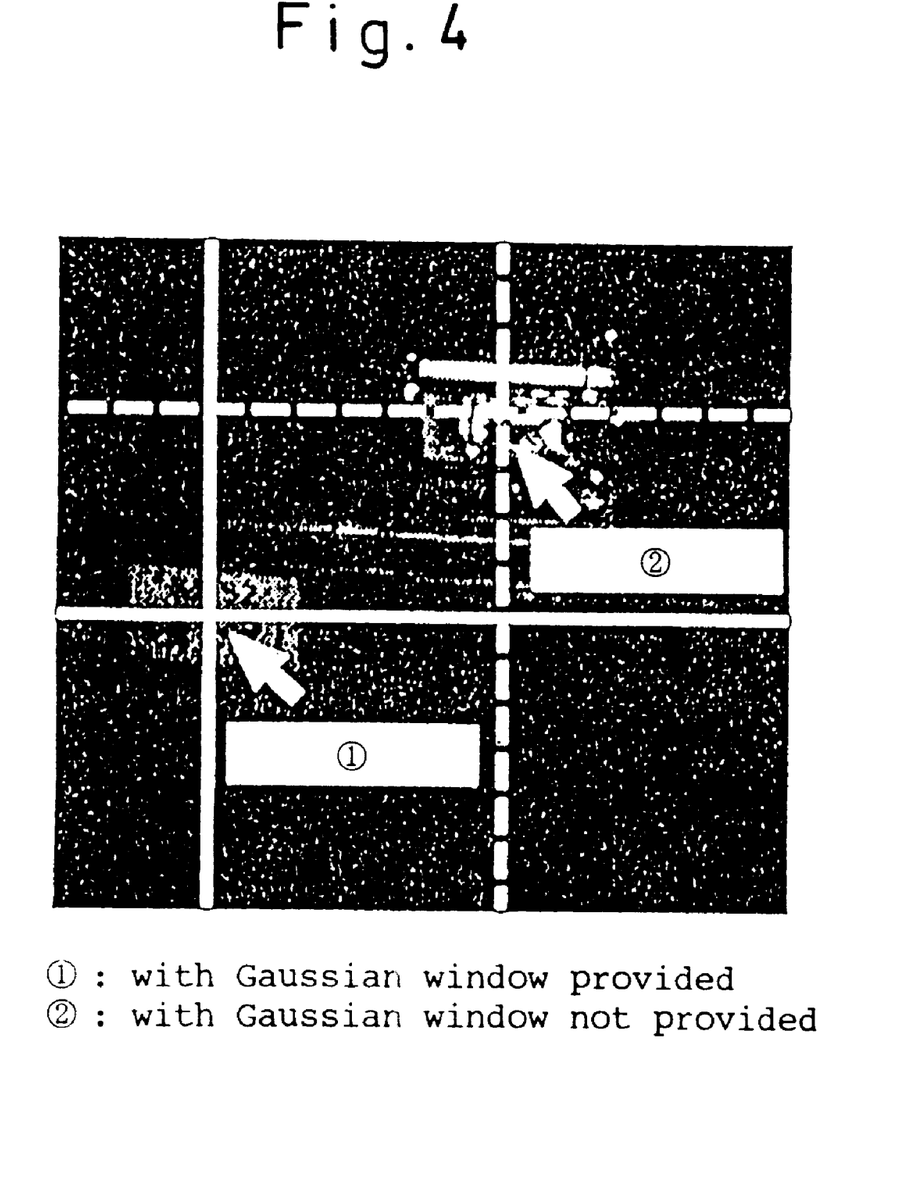
FIG. 4 is an explanatory view showing how effective it is when the Gaussian window is provided.

FIG. 3 shows a distribution of the projective addition value at an upper portion and lower portion of the drawing to compare the case in which the Gaussian window is provided with the case in which the Gaussian window is not provided. In FIG. 4, images are compared the case when generated with the Gaussian window and the case when produced without the Gaussian window.

Distinction Treatment

After the complete of the scanning, a searching is held to seek a maximum value of the license plate position distinction pattern so that the detected position is recognized as a gravity position when the neural network have learned the gravity position of the license plate 41. This is referred to "detection position determined as a maximum of addition value" in FIG. 2.

When the motor vehicle approaches within the predetermined distance, the license plate size on the original image 31 always remains constant since the camera 1 keeps focusing on the frontal portion of the motor vehicle. When the position of the license plate is recognized, it is possible to cut off the necessary image only.

With the use of the learning and teaching data, it is possible to have the neural network learn in advance.

The neural network model is represented by the three-layered stratum structure in FIG. 6. Upon learning the data, a back propagation method is used with teacher accompanied in accordance with a flow chart in FIG. 7. The unit threshold function employs sigmoid function.

As the learning data, about twenty types of image data can be used.

From the image data, the small sized region is cut off in which a cut-off point is determined through the random numbers, so as to prepare a learning input pattern in which the edge refining and contraction treatment are practiced in the same manner as carrying out the license plate position detection. In this instance, the method and image size from the cut-off treatment to the contraction treatment are the same manner as carrying out the license plate position detection.

Figure 5:
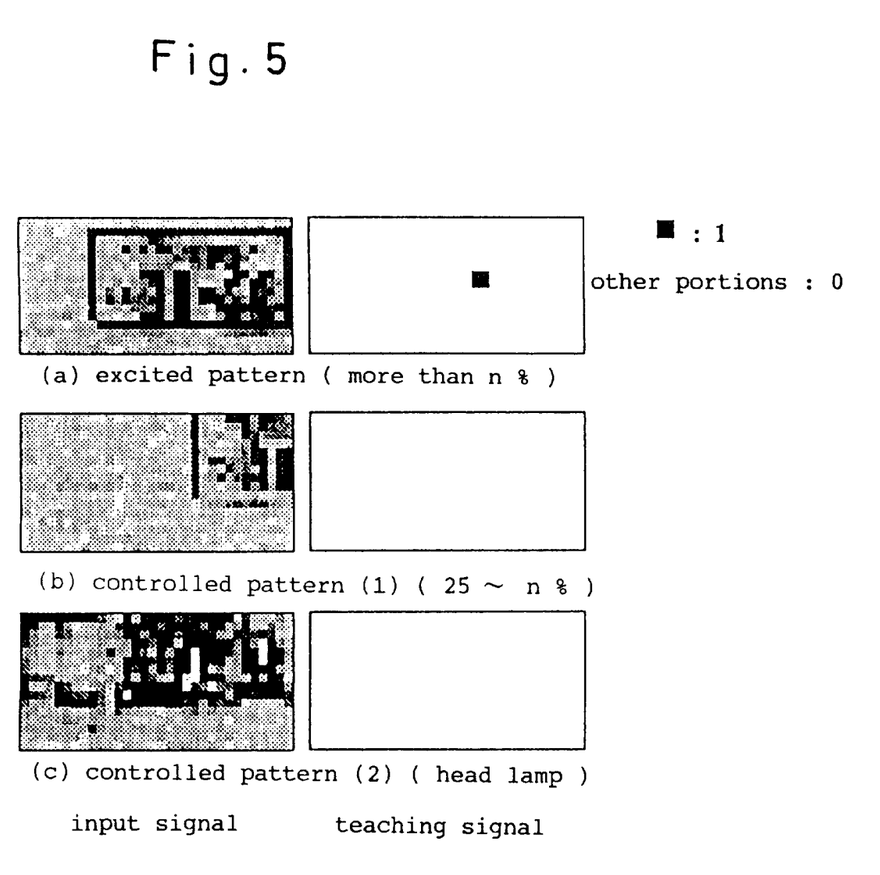
FIG. 5 is an explanatory view showing a pattern derived from teaching data.

As the teaching data pattern, an excited pattern and two controlled patterns (1), (2) are prepared as shown in FIG. 5.

The excited pattern is represented by the case in which the license plate image occupies more than n% of the image signal. The teaching signal unit is expressed by "1" when corresponded to a representative postion of the license plate.

Except for when corresponded to a representative postion of the license plate, the teaching signal unit is expressed by "0". By way of illustration, n (60%) is expressed by (license plate area within the learning data)/(entire area of the license plate).

The controlled pattern (1) is represented by the case in which the cut-off positon is out of normal place, and the license plate image occupies a small area of the image signal (n=0 ~59%). In this instance, all the units are expressed by "0".

Another controlled pattern (2) is represented by the case in which the image signal occupies the head lamp image. All the units are expressed by "0". In order to prevent the the head lamp from being mistaken for the license plate 41, the the excited pattern and the controlled patterns (1), (2) are mixedly provided as the teaching data.

The maturity of the learning is represented by the repetition until the output value of the neural network and a parameter (learning error) which can estimate the progress of the learning reach a predetermined level. The parameter is exemplified by a square error obtained from the teaching data. With the progress of the learning, the learning error reduces such as to converge toward a certain value while oscillating.

As other requirements of the learning maturity, the learning may be judged matured when the learning practices reach a certain times. Otherwise, the learning maturity may be judged when the position of the license plate is unmistakenly recognized by feeding data other than used in the learning processes.

ADVANTAGES OF THE INVENTION (i) It is possible to detect the position of the license plate 41 with high precision. This makes a number read-out device (not shown) precisely read the image of the license plate 41 when the image is sent to the number read-out device.

(ii) It is possible to accurately recognize the position of the license plates having the versatile patterns in which black, white and black letters are in turn drawn with white, green and yellow backgrounds.

(iii) It is also possible to accurately read the position of the license plate 41 under the adverse conditions such as at the time of dawn, dusk, dark hours in bad weather days. Even when the image of the head lamp is cut off from the original image, it is possible to prevent the head lamp from mistakenly recognized.

(iv) With the neural network quick in learning, it is possible to precisely detect the position of the license plate 41 with relatively small hours of the learning.

What is claimed is:

1. A positional detector device for a license plate of a motor vehicle comprising:

a camera member which photographs a front and rear portion of a motor vehicle so as to produce an image signal;

an A/D converter which converts the image signal into a digital image;

a positional detector member which detects a position of a lisence plate of a motor vehicle based on the digital image;

a cut-off treatment member which cuts off a specified region from an original image photographed by the camera member while scanning the original image when the motor vehicle approaches the camera member within a predetermined distance;

an edge refining treatment member which emphasizes a contour of a pattern represented by the specified region cut off from the original image;

a contraction treatment member which contracts an image size of the specified region which was treated with the edge refining treatment member;

a calculation treatment member which feeds the contracted pattern to a learned neural network so as to calculate an output value for a positional detection neural network;

a coordinate transformation member which transforms the output value of the positional detection neural network to such a scale as to meet the original image;

an addition treatment member which adds data at specified points which were multiplied by Gaussian window so as to obtain a projective addition value after carrying out the coordinate transformation; and a distinction treatment member which recognizes a position of the license plate based on a maximum value on which the projective addition value falls.

2. A positional detector device for a license plate of a motor vehicle comprising:

a camera member which photographs a rear portion of a motor vehicle so as to produce an image signal when the motor vehicle approaches the camera member within a predetermined distance;

an A/D converter which converts the image signal into a first sized original image;

a positional detector member which detects a position of a lisence plate of a motor vehicle based on the original image;

a cut-off treatment member which cuts off a second sized region from the first sized original image photographed by the camera member while scanning the first sized original image;

an edge refining treatment member which emphasizes a contour of a pattern represented by the second sized region cut off from the first sized original image;

a contraction treatment member which contracts the second sized region into a third sized image after treated with the edge refining treatment member;

a calculation treatment member which feeds the contracted pattern of the third sized image to a learned neural network so as to calculate an output value for a positional detection neural network as a fourth sized image value;

a coordinate transformation member which projects the output value of the positional detection neural network to a positional distinction pattern, a size of which is the same as that of the first sized region, and transforming the fourth sized image value into the second sized region;

an addition treatment member which adds data at specified points which were multiplied by Gaussian window to a positional distinction pattern of the license plate so as to obtain a projective addition value after carrying out the coordinate transformation; and a distinction treatment member which recognizes a position of the license plate based on a maximum value on which the projective addition value falls.

3. A positional detector device for a license plate of a motor vehicle as recited in claim 1 or 2, wherein learning of the neural network is based on a back propagation method which employs learning date and teaching data, and a unit threshold function is based on sigmoid function.

4. A positional detector device for a license plate of a motor vehicle as recited in claim 1 or 2, wherein the detector device is used to recognize a number of the license plate when the motor vehicle passes through a highway toll gate without stopping there.

* * * * *